(12) United States Patent
Wheeler

(10) Patent No.: US 7,571,087 B1
(45) Date of Patent: Aug. 4, 2009

(54) COMPUTER STORAGE EXCEPTION HANDLING APPARATUS AND METHOD FOR VIRTUAL HARDWARE SYSTEM

(75) Inventor: Ross Wheeler, Paradise Valley, AZ (US)

(73) Assignee: Paravirtual Corporation, Santa Clara, CA (US)

( * ) Notice: Subject to any disclaimer, the term of this patent is extended or adjusted under 35 U.S.C. 154(b) by 0 days.

(21) Appl. No.: 12/027,225

(22) Filed: Feb. 6, 2008

Related U.S. Application Data

(63) Continuation of application No. 10/987,767, filed on Nov. 12, 2004, now Pat. No. 7,356,456.

(51) Int. Cl.
*G06F 17/50* (2006.01)

(52) U.S. Cl. .............................. 703/14; 703/15; 703/22; 703/23; 716/4; 711/12

(58) Field of Classification Search .................. 703/14, 703/15, 22, 23; 716/4, 10; 711/202, 137, 711/125; 717/104; 382/145; 455/260; 712/211; 713/193

See application file for complete search history.

(56) References Cited

U.S. PATENT DOCUMENTS

| | | | | |
|---|---|---|---|---|
| 5,499,392 A * | 3/1996 | Grunwell | .................... | 455/260 |
| 5,694,481 A * | 12/1997 | Lam et al. | .................... | 382/145 |
| 5,796,974 A * | 8/1998 | Goddard et al. | ............. | 712/211 |
| 6,152,612 A * | 11/2000 | Liao et al. | ...................... | 703/23 |
| 6,269,474 B1 * | 7/2001 | Price | .......................... | 717/104 |
| 6,678,644 B1 * | 1/2004 | Segal | ........................... | 703/15 |
| 6,883,080 B1 * | 4/2005 | Tanaka et al. | ................ | 711/202 |
| 7,051,309 B1 * | 5/2006 | Crosetto | ....................... | 716/10 |
| 2002/0032559 A1 * | 3/2002 | Hellestrand et al. | ........... | 703/22 |
| 2003/0126454 A1 * | 7/2003 | Glew et al. | .................. | 713/193 |
| 2003/0182511 A1 * | 9/2003 | Asal et al. | .................... | 711/125 |
| 2004/0111685 A1 * | 6/2004 | Bowers et al. | .................. | 716/4 |
| 2006/0085602 A1 * | 4/2006 | Huggahalli et al. | ......... | 711/137 |

\* cited by examiner

*Primary Examiner*—Paul L Rodriguez
*Assistant Examiner*—Kandasamy Thangavelu
(74) *Attorney, Agent, or Firm*—Fernandez & Associates, LLP

(57) ABSTRACT

In a design system using virtual hardware models, a filtering manager for filtering execution results and determining which software instructions are candidates for restructuring. In some examples, illegal address range instructions are identified based on exception records and restructured software instructions may redirect memory access to an appropriate memory location thereby enabling the use of hardware device drivers in conjunction with hardware emulations, simulations or virtual models without requiring driver source code modifications. Using different filtering criteria, some or all legal and/or illegal memory access software instructions may be redirected to mapped memory locations enabling control over memory access functions. In some cases, debugging tools may be configured or altered to reduce, limit or disable exception handling trace messages, thereby improving overall processing performance by eliminating or reducing unnecessary or burdensome error or trace report generation.

16 Claims, 3 Drawing Sheets

Initially a virtual-hardware design system is established, configured or otherwise defined such that virtual hardware operation may proceed accordingly (Step 200).

The processor executes a software instruction associated with the operation of the virtual hardware, resulting in an execution result (Step 210)

The execution result is filtered according to one or more criteria to determine if a software instruction is a candidate for restructuring (Step 220)

Optionally, the exception record, the execution result and/or the software instruction may be tagged, sorted, queued and/or routed (Step 230).

Optionally, the software instruction may be restructured (Step 240).

Optionally, the restructured software instruction may be submitted to a target such as a processor queue (Step 250).

Optionally, a new software instruction may be submitted to a processor queue (Step 260).

Optionally, one or more processes may be removed from a processor queue (Step 270).

Optionally, exception handling trace messages may be generated by coupled software systems such as debuggers (Step 280).

Optionally, exception handling trace messages may be suppressed, limited or disabled, thereby improving overall processing performance by eliminating or reducing unnecessary or burdensome error or trace report generation (Step 290).

Figure 3

COMPUTER STORAGE EXCEPTION HANDLING APPARATUS AND METHOD FOR VIRTUAL HARDWARE SYSTEM

CROSS REFERENCE TO RELATED APPLICATION

This application is a continuation of the U.S. patent application Ser. No. 10/987,767 filed on Nov. 12, 2004, currently issued as U.S. Pat. No. 7,356,456 on Mar. 19, 2008.

BACKGROUND

1. Field

Invention relates to virtual hardware modeling system, and in particular to filtering execution results and restructuring virtual-hardware software instructions based on execution results.

2. Related Art

Conventional hardware emulation and software simulation systems enable hardware and/or software system designers to prototype product and related methods. For example various computer-aided engineering and design tools provide electronically-automated simulators that model functional components from software libraries. Additionally related emulation hardware tools are available for modeling functional components from using appropriate hardware libraries. However such conventional systems are limited to the extent that none of such systems address software and hardware performance issues arising from certain memory addressing of illegal locations. For example, embedded systems drivers may contain hard coded addresses which may refer to illegal addresses in the emulation or simulation platform system. Altering software, such as a device driver, by changing the hard coded addresses to enable virtual prototype testing is problematic. Accordingly, there is a need for improved system tool that addresses such shortcomings.

SUMMARY

In a design system using virtual hardware models, a filtering manager filters execution results and determines which software instructions are candidates for restructuring. In some examples according to the current invention, illegal address range instructions are identified based on execution results such as exception records or equivalent exception modes; in this case, restructured software instructions may redirect memory access to an appropriate memory location thereby enabling the use of hardware device drivers in conjunction with hardware emulations, simulations or virtual models without requiring driver source code modifications. In some examples, some or all legal memory access software instructions may be mapped and/or redirected to other configured legal memory locations thereby enabling control over memory access functions.

In some cases, debugging tools may be configured or altered to reduce, limit or disable exception handling trace messages, thereby improving overall processing performance by eliminating or reducing unnecessary or burdensome error or trace report generation.

Optionally, the current invention may be adapted to handle indirect memory addressing applications, as well as multiple-processor distributed applications, that can use sockets and direct function calls.

BRIEF DESCRIPTION OF DRAWINGS

FIG. 3 shows operational flow chart of software and/or hardware for performing exception handling preferably according to one or more aspects of present invention.

DETAILED DESCRIPTION

Figure 1:
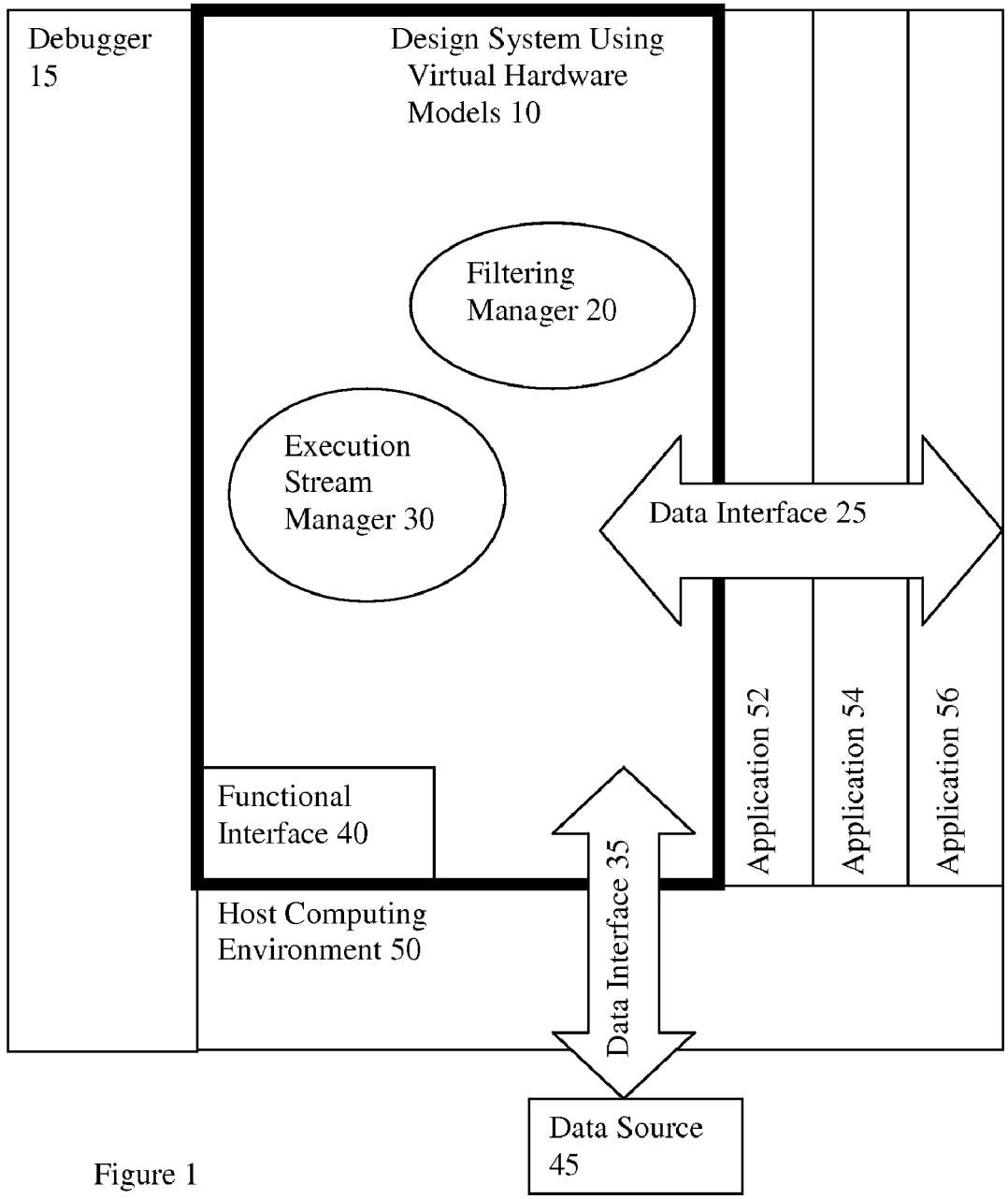
FIG. 1 illustrates an example of an improved design system using virtual hardware models for running on a hardware platform.

FIG. 1 illustrates an example of an improved design system using virtual hardware models 10 for running on a hardware platform. According to the current invention, the design system using virtual hardware models 10 comprises an optional functional interface 40 for interfacing between the design system 10 and the host computing environment 50, an execution stream manager 30 for submitting software instructions to the host computing environment 50 through the functional interface 40, and a filtering manager 20 for receiving execution results through the functional interface 40 and determining if software instructions are candidates for restructuring.

In this example, the design system 10 may be used to validate and test drivers, applications software, hardware configurations and/or hardware systems using virtual hardware models. For example, virtual hardware models (VHMs) may model, simulate or emulate circuits, application specific integrated circuits (ASICs), field programmable gate arrays (FPGAs), custom or commercially available hardware chips, systems and/or complex configurations of chips and/or systems. The execution stream manager 30 submits software instructions from the design system 10 to the host computing environment 50. In this example, the software instructions are submitted through a functional interface 40. For example, the execution stream manager submits software instructions such as virtual hardware operations for operating the virtual hardware models and/or enabling interaction between with the virtual hardware models and entities external to the design system. The filtering manager 20 receives execution results through the optional functional interface 40 and determines if the original software instructions associated with the execution results are candidates for restructuring based on one or more criteria. For example, in some cases, an application running on the host computing environment and/or a remote system may be used with a virtual hardware design and prototyping environment to interact with a virtual hardware model. For example, an application may use a target device driver to interact with a virtual hardware model. Note that in many cases, hardware drivers comprise software instructions using hard coded memory or register addresses; it is likely that these hard coded addresses correspond to restricted address ranges on a platform such as the virtual hardware design and prototyping environment. For example, a processor such as a central processing unit (CPU) may use a virtual memory (VM) system; a networking hardware driver may contain software instructions for accessing registers or memory utilizing hard coded addresses that are illegal in most VM systems. For example, according to the current invention, the execution stream manager 30 may submit a software instruction to the host computing environment 50 wherein the software instruction comprises an illegal memory access such as, but not limited to, a read or write instruction to a hard coded address or an indirect read or indirect write instruction referencing a hard coded address. When the host computing environment executes the software instruction, the execution results may comprise an exception. The filtering manager 20 may receive the execution result as an exception record through optional functional interface 40. The filtering manager 20 may assess the received execution result to determine if the software instruction is a candidate for restructuring based on one or more criteria. For example, in some cases, the filtering manager may receive an exception record, determine the software instruction related to that exception record and then determine if the software instruction is a candidate based on restructuring based in part or wholly on one or more criteria related to the software instruction, the exception record and/or the status of the design system 10 and/or host computing environment 50.

Optionally, the current invention may restructure the software instruction and/or submit the software instruction and/or execution results to another entity for software instruction restructuring. For example, in some cases, the software instruction may be partially or completely restructured by the current invention. However, in other examples, the software instruction and/or execution result may be submitted to an external entity for software instruction restructuring. In some cases, a restructured software instruction may be directed back to same processor that executed the original software instruction. For example, a restructured software instruction may be directed for execution to a local target processor such as processor 60 and the restructured software instruction may redirect a memory and/or resource access to a new location. However, in other examples according to the current invention, the restructured software instruction may be redirected for execution to a target such as, but not limited to, a local process, remote process, local processor, remote processor, local device, remote device, local application, remote application, distributed application, local system, remote system and/or distributed resource.

The following example illustrates the possible operation of a filtering manager when a filtering criterion is to identify candidates for restructuring based on an illegal memory access due to a virtual hardware operation: the filtering manager may analyze the exception record, identify the original software instruction that caused the exception, identify that the exception was the result of an illegal memory access associated with a virtual hardware operation and restructure the original software instruction to redirect the memory access to a new, legal memory location consistent with the operation of the virtual hardware. In some cases, the filtering manager may submit the new restructured software instruction to the execution stream manager 30. Using this technique may enable the execution of the device driver's software instruction on the host computing environment 50 without requiring changes to the original hardware driver source code.

In some cases, it may be desirable to exercise partial or complete control over virtual-hardware software instructions regarding memory access, including legal memory access instructions. In this case, the filtering manager may be configured to use the appropriate criteria to determine if a software instruction is a candidate for restructuring. A memory mapping configuration may be used to guide software instruction restructuring to redirect some or all legal memory access. Note that in this example, the execution result associated with the original software instruction (comprising a legal memory access) will probably not comprise an exception.

In some cases, as part of the filtering process, the filtering manager may tag, sort, queue and/or route execution results and/or software instructions based on one or more criteria. In some cases, this may be done in preparation for restructuring software instructions by the filtering manager and/or by a system internal and/or external to the current invention. In some cases, the tagged, sorted, enqueued and/or routed execution results and/or software instructions may be provided to a system internal and/or external to the current invention. For example, in some cases, the tagged, sorted, enqueued and/or routed execution results and/or software instructions may be provided or routed to one or more applications for compiling statistics and/or generating a report. In some cases, the design system may comprise a report generator.

In some cases, the filtering manager may use additional information and/or criteria to determine if a software instruction is a candidate for restructuring. In some cases, additional information and/or criteria may be used to restructure the software instruction and/or additional actions may be taken such as, but not limited to, removing processes from a processor queue and/or submitting one or more new software instructions. For example, in some cases, software instructions for clearing one Mbyte (megabyte) of hardware memory could potentially incur one million exceptions when used in conjunction with a virtual hardware model in the current invention. In a virtual hardware system, a one Mbyte hardware memory block may be modeled as a file or block of memory in a virtual hardware model. In some cases, the filtering manager may have a memory of events and/or access to a memory of events such as, but not limited to a chronological listing of exception records. For example, the filtering manager may monitor events for one or more patterns such as repeated exceptions based on zeroing adjacent memory addresses. In some cases, another process or system may perform the monitoring and notify the filtering manager when the pattern is identified. The filtering manager may take actions, or cause actions to be taken, such as, but not limited to, restructuring software instructions, removing instructions from a processor queue, adding and/or restructuring instructions in a processor queue. For example, some instructions corresponding to zeroing a one Mbyte data block may be removed from a processor queue and a virtual model of that memory may be zeroed efficiently with an alternate command or commands; preferably, the alternate command or commands may zero the virtual model in a reduced number of process cycles while also reducing the overhead associated with incurring exceptions. For example, for Intel 8086 style architectures, the multiple instructions corresponding to zeroing a large block of memory may be replaced with a single "rep movsw" command in 8086 assembly language. The "rep movsw" command copies a block of bytes/words from one location in memory to another, and may be used in this case to copy a block of zeroed bytes to the virtual block of memory. In some cases, the removed instructions may be replaced with a no operation instruction such as "nop" in 8086 assembly language. In this case, multiple software instructions were restructured into a single restructured software instruction. However, in other examples, a multiple software instructions may be restructured into multiple restructured software instructions. Similarly, a single software instruction may be restructured into multiple restructured software instructions.

Filtering manager criteria may include simple and/or complex criteria and may be based on one or more software instructions and/or execution results and/or the history, state or status of the design system, the host computing environment and/or systems such as the host computing environment's exception handler.

According to the current invention, in some cases, data and/or data streams may be introduced to the design system 10. For example, a testing application may introduce an external data stream of real or simulated network traffic through optional data interface 35 to test a virtual hardware model of a networking device. Similarly, data may be extracted from the design system 10. Alternately, optional data interface 25 may be used to introduce data and/or a data stream through an application running on the same host computing environment. Data interfaces such as data interfaces 25 and 35 may couple the design system 10 to entities external to the current invention such as, but not limited to: local, remote and/or networked resources such as applications, hardware systems, databases, look-up tables, storage systems and/or libraries.

In some cases, the current invention may interact with other applications and/or systems. For example, in some cases, the design system 10 may send and/or receive a message, SNMP (Simple Network Management Protocol) trap, announcement, warning or notification. In some cases, these interactions may be used to control, configure and/or administer the design system 10. In other cases, these interactions may be used to communicate status, test results, data and/or error conditions.

Exception record formats differ according to operating system type and version. In some examples, parts of the current invention for detecting, retrieving, receiving and/or analyzing exception records may be implemented as one or more low level software routines, possibly, but not necessarily, in assembly language.

Optional functional interface 40 enables interaction between the design system 10 and the host computing environment. For example, functional interface 40 may comprise elements such as, but not limited to, application program interface functions (APIs). In this example, the functional interface 40 is part of the design system. However, in other examples, some or all of the functional interface may be external to the current invention and/or part of the host computing environment and/or the internal to the design system.

Figure 2:
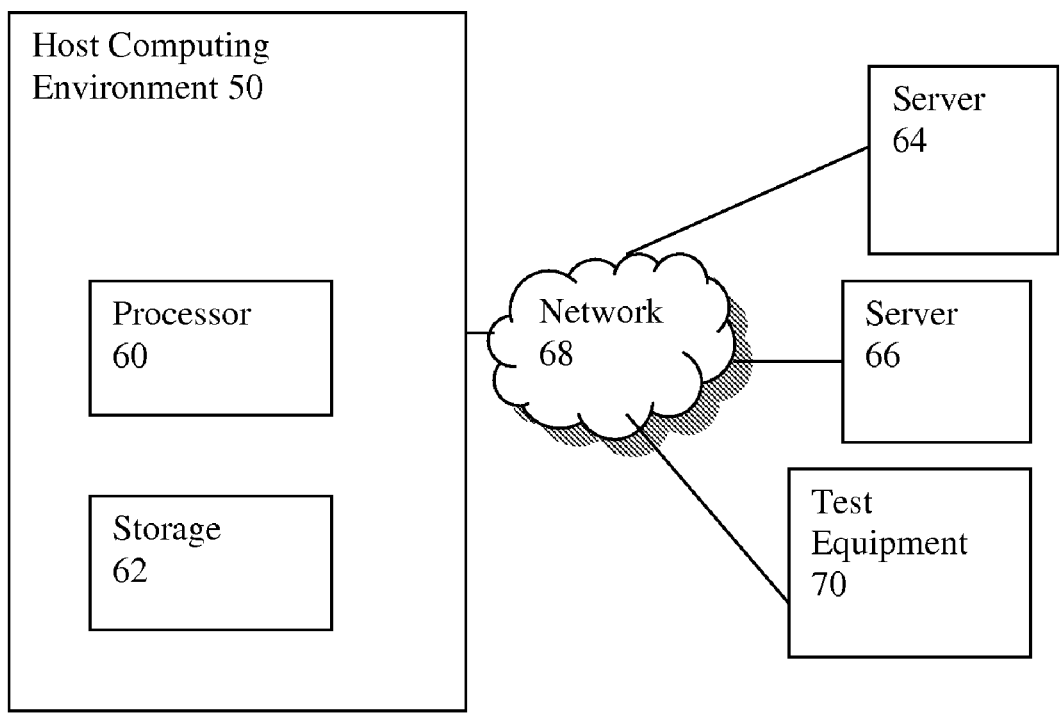
FIG. 2 illustrates an example of a virtual hardware design and prototyping environment having a processor and storage, optionally coupled to a network and network resources, including servers and test equipment.

FIG. 2 illustrates an example host computing environment 50 including a processor 60 and storage 62, optionally coupled to a network 68 and network resources including servers 64 and 66 and Test Equipment 70. In other examples according to the current invention, the improved design system may run on a variety of hardware platforms and environments including, but not limited to: a client-server environment, a thin client environment, a mainframe system, a distributed computing platform, a supercomputer and/or a clustered environment. As shown, the hardware platform may use conventional digital equipment as commercially available and may run conventional operating systems such as, but not limited to: Windows, Linux and Solaris family operating systems.

According to the current invention, when operating application software for interaction with the design system using virtual hardware models 10, the application software and the design system 10 may run as distinct processes on the same computer. However, according to the current invention, the application software may run partially or completely on one or more remote systems. Similarly, the virtual hardware model may run on one or more local and/or remote computer systems. For example, the virtual hardware model may be implemented to operate in a clustered server environment, distributed server environment or supercomputer array.

In some cases, debugging software such as, but not limited to the debugger associated with Microsoft's Visual Studio, may be used in conjunction with a virtual hardware design and prototyping environment for accessing data in storage 12 and may generate exception handling trace messages. In some cases, some or all of these messages may be suppressed, limited or disabled, thereby improving overall processing performance by eliminating or reducing unnecessary or burdensome error or trace report generation. In some cases, depending on the specific environment, this may be achieved through configuration and/or alteration of the debugging tool, operating system, and/or environment. In other cases, an optional message handling module 38 may manage error and trace report generation. For example, the routine detailed in Appendix A provides an example of how some debugger messages may be suppressed in a Microsoft Visual Studio environment. Appendix B is a Microsoft manual page describing the usage of the "ContinueDebugEvent" call. The contents of Appendix A and Appendix B and their teachings are to be considered part of the specification and detailed description of embodiments of the invention disclosed herein. It is also to be understood that embodiments of the invention described in Appendix A are not intended to be limiting of any of the other embodiments discussed above. In the example illustrated in Appendix A, a call to the Microsoft function "ContinueDebugEvent" may be used to stop all exception processing and continue the thread, thereby suppressing subsequent debugger messages. In this example, the normal exception debug event is waited on. If an exception debug event occurs when in the running state, this routine attempts to determine if the exception was due to an access violation. If the exception was due to an access violation, additional processing may be executed according to a configured exception policy.

In some cases, software, such as target device drivers, may be recompiled for operation in the design system 10. For example, target device driver may be recompiled for operation on processor 60. In some cases, alteration of the software's source code to redirect hard coded memory addresses may not be required for operation in the design system 10.

Optionally filtering manager 20 may be adapted to handle indirect memory addressing applications, as well as multiple-processor distributed applications. Additionally filtering manager 20 may handle available use sockets, as well as direct function calls.

Moreover exception handler may discriminate adaptively according to heuristic rule set 20 for selective blocking of groups or sub-groups of specified memory locations, such as sensitive medical or financial data structures. Preferably exception handler effectively operates transparently to software developer or system user.

It is envisioned that the current invention may be used in a variety of application areas such as, but not limited to, embedded systems design, modeling and testing. For example, the current invention may support virtual hardware models representing network elements, devices, systems, structures and/or infrastructure. The current invention may be used to support simulations, stress testing, configuration analysis, operational analysis, design and/or development of devices, hardware, software, firmware, and/or hardware, software, application and/or networking architectures under various conditions. In some examples, the virtual hardware models may represent analog, digital, optical, magnetic and/or hybrid, elements, devices and/or systems. Furthermore, the current invention may be used in application areas such as testing, developing and modeling devices, behaviors and/or designs associated with a variety of applications such as, but not limited to: network applications, biological systems, manufacturing, aerospace systems, real-time systems, financial markets, operations research, information technology architecture and/or medical devices.

FIG. 3 shows operational flow chart of software and/or hardware for performing filtering virtual-hardware operation execution results and determining if a software instruction is a candidate for restructuring preferably according to one or more aspects of present invention. Initially a design system using virtual hardware models for running on a hardware platform is established, configured or otherwise defined such that virtual hardware operation may proceed accordingly (Step 200). A virtual design system comprises at least an execution stream manager, a filtering manager and a functional interface supporting the operation of a virtual hardware model for emulating, simulating or modeling the behavior of one or more circuits, application specific integrated circuits (ASICs), field programmable gate arrays (FPGAs), custom or commercially available hardware chips, systems and/or complex configurations of chips and/or systems. The process continues when the processor executes a software instruction associated with the operation of the virtual hardware, resulting in an execution result (Step 210). The execution result may be an exception, exception record and/or equivalent exception mode. The execution result is filtered according to one or more criteria to determine if a software instruction is a candidate for restructuring (Step 220). Optionally, the exception record, the execution result and/or the software instruction may be tagged, sorted, queued and/or routed (Step 230). Optionally, the software instruction may be restructured (Step 240). Optionally, the restructured software instruction may be submitted to a processor queue (Step 250). Optionally, a new software instruction may be submitted to a target such as a processor queue (Step 260). In some cases, the target may be another local, remote and/or distributed process, application, device, processor and/or system. In some cases, the step of submitting a software instruction to a target may comprise the use of IPCs (Inter-process Communications), messages, pipes, mailslots, sockets, remote procedure calls (RPC), and/or shared objects. Optionally, one or more processes may be removed from a processor queue (Step 270). Optionally, exception handling trace messages may be generated by coupled software systems such as debuggers (Step 280). Optionally, exception handling trace messages may be suppressed, limited or disabled, thereby improving overall processing performance by eliminating or reducing unnecessary or burdensome error or trace report generation (Step 290).

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

APPENDIX A

```
#include "stdafx.h"
#include <BugslayerUtil.h>
#include "AddIn.h"
#include "device_monitor.h"
#include "device_monitor_api.h"
///////////////////////////////////////////////////////////////////
///////////////////////////////////////////////////////////////////
BOOL_stdcall device_monitor_wait_for_debug_event
(LPDEBUG_EVENT p_debug_event, DWORD milliseconds)
{
  BOOL exception_record_event = FALSE;
  BOOL last_chance_exception = FALSE;
  DWS_DEVICE_MONITOR* p_monitor = NULL;
  BOOL rcode = FALSE;
  HMODULE dm = NULL;
  rcode = ::WaitForDebugEvent (p_debug_event, milliseconds);
  p_monitor = DWS_DEVICE_MONITOR::get_monitor ( );
  if (p_monitor == NULL)
    {
    DWS_TRACE (">> dwsDeviceMonitor: invalid Device Monitor \n");
    return (rcode);
    }
  dm = p_monitor->load_debug_monitor ( );
  if (p_monitor->get_device_monitor_state
    ( ) ==
DWS_DEVICE_MONITOR::DEVICE_MONITOR_STATE::DWS_RUNNING)
    {
    if (p_debug_event->dwDebugEventCode ==
EXCEPTION_DEBUG_EVENT)
      {
      if (p_debug_event-
>u.Exception.ExceptionRecord.ExceptionCode ==
EXCEPTION_ACCESS_VIOLATION)
        {
        if (p_debug_event->u.Exception.dwFirstChance
!= 0)
          {
          //first time the debugger has
encountered the exception.
          exception_record_event = TRUE;
          }
        else
          {
          //the debugger has previously
encountered the exception. the device will be terminate . . .
          last_chance_exception = FALSE;
          }
        }
      }
    if (exception_record_event == TRUE)
      {
      rcode = FALSE;
      ContinueDebugEvent (p_debug_event->dwProcessId,
p_debug_event->dwThreadId, p_mon-
itor->get_monitor_exception_policy
( ) );
      if (last_chance_exception)
        {
        p_monitor->set_device_monitor_state
(DWS_DEVICE_MONITOR::DEVICE_MONITOR_STATE::DWS_STOPPED);
        }
      memset (p_debug_event, 0x00, sizeof
(DEBUG_EVENT));
      }
    }
  return (rcode);
}
```

APPENDIX B

ContinueDebugEvent

The ContinueDebugEvent function enables a debugger to continue a thread that previously reported a debugging event.
BOOL ContinueDebugEvent(
   DWORD dwProcessId,
   DWORD dwThreadId,
   DWORD dwContinueStatus
);
Parameters
dwProcessId
    [in] Handle to the process to continue.
   dwThreadId
    [in] Handle to the thread to continue. The combination
    of process identifier and thread identifier must identify
    a thread that has previously reported a debugging event.
      dwContinueStatus
    [in] Options to continue the thread that reported the
    debugging event.
    If the DBG_CONTINUE flag is specified for this parameter
    and the thread specified by the dwThreadId parameter
    previously reported an EXCEPTION_DEBUG_EVENT
    debugging event, the function stops all exception processing and
    continues the thread. For any other debugging event, this flag
    simply continues the thread.
    If the DBG_EXCEPTION_NOT_HANDLED
    flag is specified for this parameter and the thread
    specified by dwThreadId previously reported an EX-
    CEPTION_DEBUG_EVENT debugging event, the function
    continues exception processing. If this is a first-chance ex-
    ception event, the search and dispatch logic of the structured
    exception handler is used; otherwise, the process is terminated.
    For any other debugging event, this flag simply
    continues the thread.
      Return Values If the function succeeds, the return value is nonzero.
    If the function fails, the return value is zero.
    To get extended error information, call
    GetLastError.
    Remarks Only the thread that created dwProcessId with the
    CreateProcess function can call
    ContinueDebugEvent.
    After the ContinueDebugEvent function succeeds, the
    specified thread continues.
    Depending on the debugging event previously reported
    by the thread, different actions occur. If the continued
    thread previously reported an EXIT_THREAD_DE-
    BUG_EVENT debugging event, ContinueDebugEvent
    closes the handle the debugger has to the thread. If the
    continued thread previously reported an EXIT_PRO-
    CESS_DEBUG_EVENT debugging event,
    ContinueDebugEvent closes the handles the debugger has
    to the process and to the thread.
    Example Code For an example, see Writing the Debugger's Main Loop.
    Requirements Client: Requires Windows XP, Windows 2000 Professional,
    Windows NT Workstation, Windows Me, Windows 98,
    or Windows 95.
    Server: Requires Windows Server 2003, Windows 2000
    Server, or Windows NTServer.
    Header: Declared in Winbase.h; include Windows.h.
    Library: Use Kernel32.lib.
    DLL: kernel32.dll
    See Also Basic Debugging Overview, Debugging Functions,
    CreateProcess Last updated: October 2004 | What did you think of this topic? | Order a Platform SDK CD © 2004 Microsoft Corporation. All rights reserved. Terms of use.

The invention claimed is:

1. In a host computing environment (HCE) comprising a processor, a virtual memory system and a virtual-hardware model for running on the HCE, a virtual hardware operation filtering method comprising:
   executing a software instruction in a program running natively on the HCE, the software instruction associated with a virtual-hardware operation and comprising an illegal HCE virtual memory access resulting in an exception;
   determining whether the exception indicates that the software instruction is a candidate for restructuring; and
   restructuring the software instruction by redirecting the illegal memory access to a new memory location mapped to a process for handling the virtual-hardware operation.

2. The method of claim 1, wherein the process is local to the HCE.

3. The method of claim 2, wherein the process is a device driver.

4. The method of claim 1, wherein the process is a remote process.

5. The method of claim 2, wherein the process is for compiling statistics on virtual-hardware operations.

6. The method of claim 5, wherein the process monitors statistics for exception patterns.

7. The method of claim 2, wherein the process is for generating a report on virtual-hardware operations.

8. The method of claim 2, further comprising:
   removing or adding one or more processes from or to the HCE.

9. A host computing environment (HCE) for running a virtual hardware model, comprising:
   a processor having a virtual memory system; and
   a memory element storing a program comprising a software instruction, the program to run natively on the HCE, the software instruction associated with a virtual-hardware operation and comprising an illegal HCE virtual memory access resulting in an exception;
   the HCE processor to:
      execute the software instruction natively on the HCE, the execution resulting in an exception;
      determine whether the exception indicates that the software instruction is a candidate for restructuring; and
      restructure the software instruction by redirecting the illegal memory access to a new memory location mapped to a process for handling the virtual-hardware operation.

10. The system of claim 9, wherein the process runs locally on the HCE.

11. The system of claim 10, wherein the process is a device driver.

12. The system of claim 9, wherein the process is a remote process.

13. The system of claim 10, wherein the process is for compiling statistics on virtual-hardware operations.

14. The system of claim 13, wherein the process monitors statistics for exception patterns.

15. The system of claim 10, wherein the process is for generating a report on virtual-hardware operations.

16. The system of claim 10, the HCE processor further to: remove or add one or more processes from or to the HCE.

\* \* \* \* \*